US012580491B2

(12) United States Patent
Nguyen et al.

(10) Patent No.: US 12,580,491 B2
(45) Date of Patent: Mar. 17, 2026

(54) MULTIPLE-PORT BIDIRECTIONAL CONVERTER

(71) Applicant: LITE-ON SINGAPORE PTE. LTD., Singapore (SG)

(72) Inventors: Xuan Bac Nguyen, Singapore (SG); Prasanth Thummala, Singapore (SG); Van Tien Le, Singapore (SG); Cindy Wan Yi Goh, Singapore (SG)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 199 days.

(21) Appl. No.: 18/669,578

(22) Filed: May 21, 2024

(65) Prior Publication Data

US 2025/0158530 A1 May 15, 2025

(30) Foreign Application Priority Data

Nov. 9, 2023 (SG) .......................... 10202303193X

(51) Int. Cl.
H02M 3/335 (2006.01)
H01F 3/14 (2006.01)
(Continued)

(52) U.S. Cl.
CPC .......... H02M 3/33584 (2013.01); H01F 3/14 (2013.01); H01F 27/2804 (2013.01);
(Continued)

(58) Field of Classification Search
CPC .......... H02M 3/333584; H02M 1/007; H02M 3/33573; H02M 3/33592; H01F 3/14; H01F 27/2804
See application file for complete search history.

(56) References Cited

U.S. PATENT DOCUMENTS 11,101,737 B2 * 8/2021 Sun ...................... H02J 7/0018
2016/0016479 A1 1/2016 Khaligh et al.
(Continued)

FOREIGN PATENT DOCUMENTS

CN 208723603 U 4/2019
CN 110356269 A 10/2019
(Continued)

OTHER PUBLICATIONS

Taiwan Intellectual Property Office "Office Action" issued on Dec. 24, 2024, TIPO.
Office Action issued by TIPO on Mar. 13, 2025.

*Primary Examiner* — Rafael O De Leon De Domenech
(74) *Attorney, Agent, or Firm* — WPAT, PC

(57) ABSTRACT

A multiple-port bidirectional converter is provided. The multiple-port bidirectional converter includes a transformer, a primary full-bridge converter, a first high voltage (HV) power converting unit, a second HV power converting unit, a first low voltage (LV) power converting unit, a second LV power converting unit, a full-bridge diode rectifier, and a full-bridge inverter. The transformer includes a core, one primary winding and five secondary windings. The primary full-bridge converter is coupled to the first primary winding and receives an input voltage. The first/second HV power converting unit, coupled to the first/second secondary winding, outputs a first/second high DC voltage to a first/second HV battery. The first/second LV power converting unit, coupled to the third/fourth secondary winding, outputs a first/second low DC voltage to a first/second LV battery. The full-bridge diode rectifier is coupled to the fifth secondary winding and the full-bridge diode rectifier to output an AC output voltage.

20 Claims, 7 Drawing Sheets

(51) Int. Cl.
  *H01F 27/28* (2006.01)
  *H02M 1/00* (2006.01)
  *B60L 53/22* (2019.01)
  *H01F 3/10* (2006.01)

(52) U.S. Cl.
  CPC ....... *H02M 1/007* (2021.05); *H02M 3/33571* (2021.05); *H02M 3/33573* (2021.05); *H02M 3/33592* (2013.01); *B60L 53/22* (2019.02); *H01F 2003/106* (2013.01)

(56) References Cited

U.S. PATENT DOCUMENTS

| | | | | |
|---|---|---|---|---|
| 2022/0045618 A1* | 2/2022 | Kumar | .................... | H02J 7/007 |
| 2022/0045619 A1* | 2/2022 | Jia | ..................... | H02M 3/33573 |
| 2022/0321016 A1* | 10/2022 | Khaligh | ............ | H02M 3/33561 |
| 2023/0062219 A1 | 3/2023 | Miyata et al. | | |
| 2023/0095422 A1 | 3/2023 | Pathipati | | |

FOREIGN PATENT DOCUMENTS

| | | | |
|---|---|---|---|
| CN | 111355398 A | 6/2020 |
| CN | 113949282 A | 1/2022 |
| TW | 202207601 A | 2/2022 |
| TW | 202309945 A | 3/2023 |
| WO | WO 2021/153484 A1 | 8/2021 |
| WO | WO 2021/227230 A1 | 11/2021 |

* cited by examiner

| No. | Situation | Second MCU | | Third MCU | | Redundant mode |
|---|---|---|---|---|---|---|
| | | First HV power converting unit | First LV power converting unit | Second HV power converting unit | Second LV power converting unit | |
| 1 | First HV battery fails | X | OUT | IN | OUT | The second HV power converting unit supplies power to both of the first LV power converting unit and the second LV power converting unit |
| 2 | Second HV battery fails | IN | OUT | X | OUT | The first HV power converting unit supplies power to both of the first LV power converting unit and the second LV power converting unit |
| 3 | First LV power converting unit fails | IN | X | IN | OUT | Both of the first HV power converting unit and the second HV power converting unit supply power to the second LV power converting unit |
| 4 | Second LV power converting fails | IN | OUT | IN | X | Both of the first HV power converting unit and the second HV power converting unit supply power to the first LV power converting unit |
| 5 | Both of the first HV power converting unit and first LV power converting unit fail | X | X | IN | OUT | The second HV power converting unit and the second LV power converting unit operate normally |
| 6 | Both of the second HV power converting unit and the second LV power converting unit fail | IN | OUT | X | X | The first HV power converting unit and the first LV power converting unit operate normally |

FIG. 4

MULTIPLE-PORT BIDIRECTIONAL CONVERTER

This application claims the benefit of Singapore provisional application Ser. No. 10202303193X, filed on Nov. 9, 2023, the disclosure of which is incorporated by reference herein in its entirety.

TECHNICAL FIELD

The disclosure relates to a multiple-port bidirectional converter.

BACKGROUND

Efforts on an international scale to combat global warming have begun, driving the progress of electric vehicles (EVs) with the aim of reducing fuel consumption. In EV charging, a conventional approach for a combo onboard charger has been introduced. Nevertheless, this approach poses challenges such as increased size and cost. Furthermore, to ensure redundant operation for safety reasons, multiple converters and several transformers are needed to supply redundant outputs, which necessitates additional costs and space. Consequently, finding ways to minimize the cost and size of the onboard charger becomes imperative.

SUMMARY

According to one embodiment, a multiple-port bidirectional converter is provided. The multiple-port bidirectional converter includes a transformer, a primary full-bridge converter, a first high voltage (HV) power converting unit, a second HV power converting unit, a first low voltage (LV) power converting unit, a second LV power converting unit, a full-bridge diode rectifier, and a full-bridge inverter. The transformer includes a core, a first primary winding, a first secondary winding, a second secondary winding, a third secondary winding, a fourth secondary winding, and a fifth secondary winding. The primary full-bridge converter is coupled to the first primary winding and receives an input voltage from a primary direct current (DC) voltage source. The first HV power converting unit, coupled to the first secondary winding, outputs a first high DC voltage to a first HV battery. The second HV power converting unit, coupled to the second secondary winding, outputs a second high DC voltage to a second HV battery. The first LV power converting unit, coupled to the third secondary winding, outputs a first low DC voltage to a first LV battery. The second LV power converting unit, coupled to the fourth secondary winding, outputs a second low DC voltage to a second LV battery. The full-bridge diode rectifier is coupled to the fifth secondary winding. The full-bridge inverter is coupled to the full-bridge diode rectifier and outputs an alternating current (AC) output voltage to an AC load.

BRIEF DESCRIPTION OF THE DRAWINGS

FIG. 4 shows an example of the redundant mode operated by the multiple-port bidirectional converter applied in an OPU for an EV according to an embodiment of the disclosure.

Figure 1:
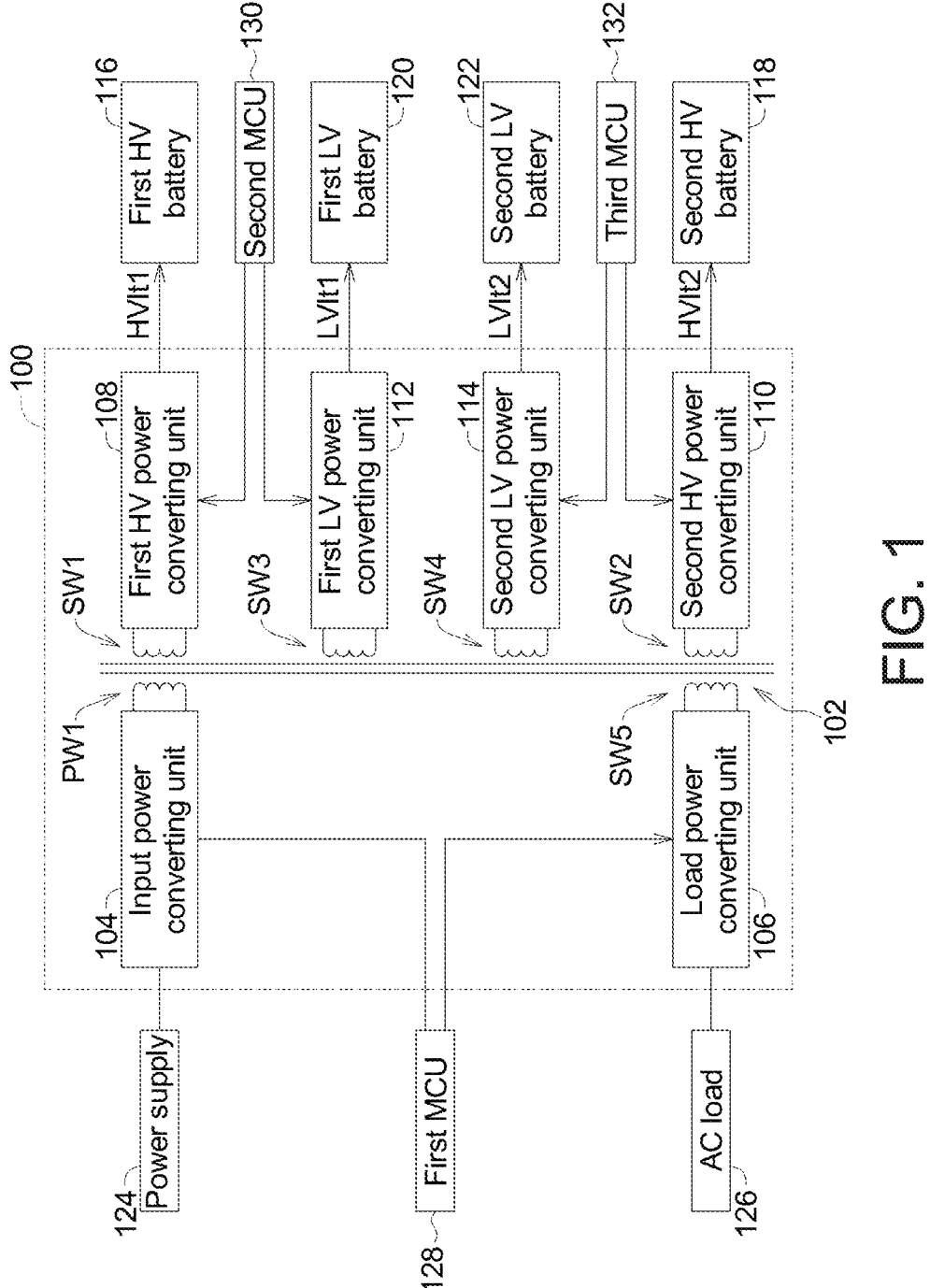
FIG. 1 illustrates a block diagram of a multiple-port bidirectional converter in an on-board power unit (OPU) for an electrical vehicle (EV) according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, FIG. 1 illustrates a block diagram of a multiple-port bidirectional converter in an on-board power unit (OPU) for an electrical vehicle (EV) according to an embodiment of the disclosure. OPU is responsible for managing battery charging and discharging, as well as providing power to various vehicle systems such as motors, electronics, and so on. The multiple-port bidirectional converter has multiple ports for connection of multiple power sources and loads. These power sources may be, for example, a utility grid, a photovoltaic panel, a wind power generator, a battery, a fuel cell, and so on. As shown in FIG. 1, a multiple-port bidirectional converter 100, for example, includes a transformer 102, an input power converting unit 104, a load power converting unit 106, a first high voltage (HV) power converting unit 108, a second HV power converting unit 110, a first low voltage (LV) power converting unit 112, and a second LV power converting unit 114. The first HV power converting unit 108 outputs a first high direct current (DC) voltage HVlt1 to a first HV battery 116. The second HV power converting unit 110 outputs a second high DC voltage HVlt2 to a second HV battery 118. The first LV power converting unit 112 outputs a first low DC voltage LVlt1 to a first LV battery 120. The second LV power converting unit 114 outputs a second low DC voltage LVlt2 to a second LV battery 122. The input power converting unit 104 receives input power from power supply 124. The load power converting unit 106 may output power to an alternating current (AC) load 126.

For example, the power supply 124 may be a utility grid. The multiple-port bidirectional converter 100 may operate in a first operation mode. In the first operation mode, the input power converting unit 104 may transfer power to the first HV battery 116, the second HV battery 118, the first LV battery 120, the second LV battery 122, and the AC load 126. Thus, in the first operation mode, the first HV battery 116 and the second HV battery 118 may receive power. The multiple-port bidirectional converter 100 may also operate in a second operation mode. In the second operation mode, the first HV power converting unit 108 and the second HV power converting unit 110 may transfer power to the first LV battery 120, the second LV battery 122, the power supply 124 and the AC load 126. Thus, in the second operation mode, the first HV battery 116 and the second HV battery 118 may transfer power. Since the first HV battery 116 and the second HV battery 118 may either receive or transfer power, the multiple-port bidirectional converter 100 is thus bidirectional.

The transformer 102 comprises a core (not shown in FIG. 1), a first primary winding PW1, a first secondary winding SW1, a second secondary winding SW2, a third secondary winding SW3, a fourth secondary winding SW4, and a fifth secondary winding SW5. The input power converting unit 104 is coupled to the first primary winding PW1. The first HV power converting unit 108 is coupled to the first secondary winding SW1. The second HV power converting unit 110 is coupled to the second secondary winding SW2. The first LV power converting unit 112 is coupled to the third secondary winding SW3. The second LV power converting unit 114 is coupled to the fourth secondary winding SW4.

A first microcontroller (MCU) 128 controls the input power converting unit 104 and the load power converting unit 106. A second MCU 130 controls the first HV power converting unit 108 and the first LV power converting unit 112. A third MCU 132 controls the second HV power converting unit 110 and the second LV power converting unit 114.

Figure 2:
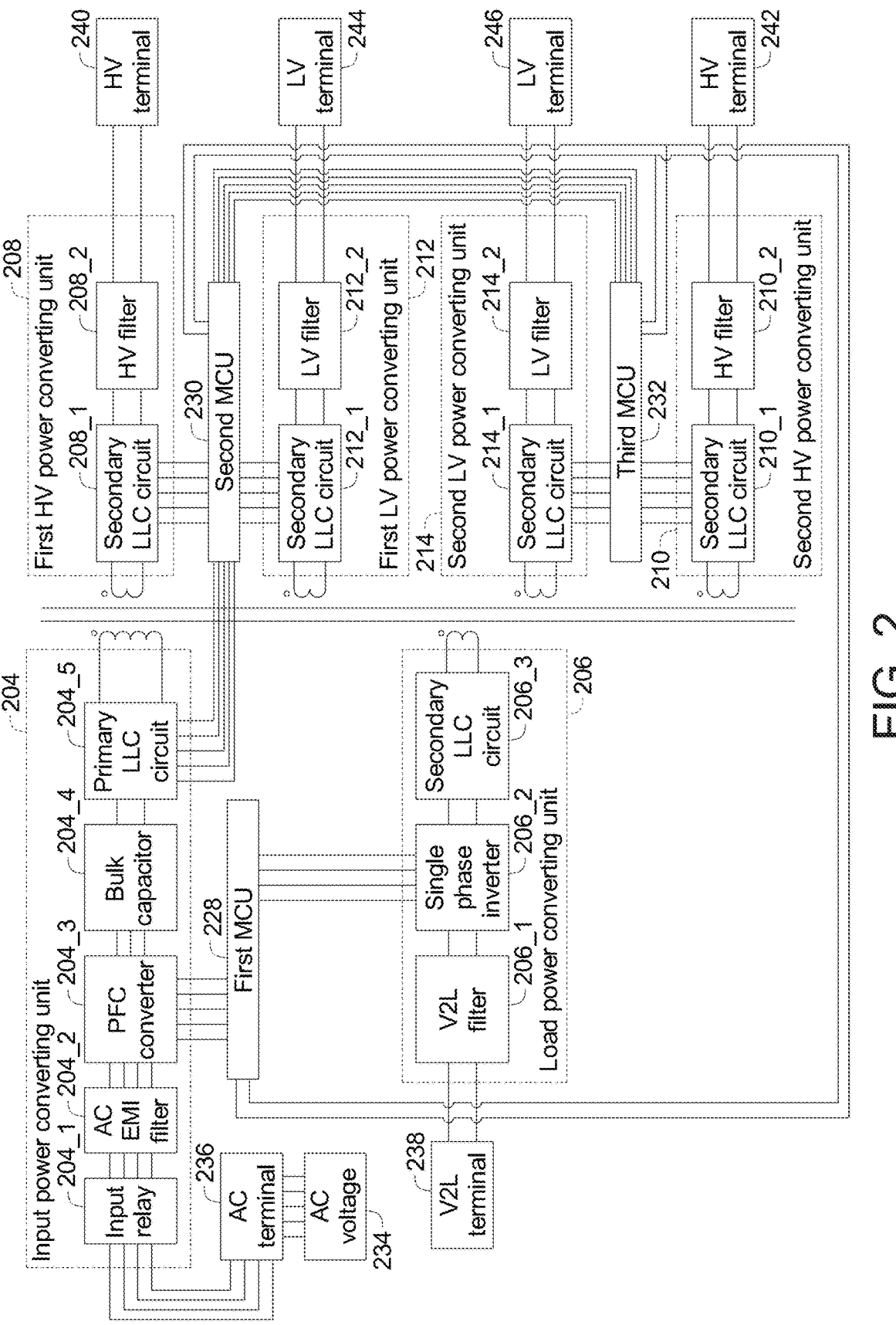
FIG. 2 illustrates a block diagram of an example of a multiple-port bidirectional converter in an OPU for an EV according to an embodiment of the disclosure.

Referring to FIG. 2, FIG. 2 illustrates a block diagram of an example of a multiple-port bidirectional converter in an OPU for an EV according to an embodiment of the disclosure. Input power converting unit 204, for example, includes an input relay 204_1, an AC EMI (Electromagnetic Interference) filter 204_2, a power factor correction (PFC) converter 204_3, a bulk capacitor 204_4, and a primary LLC (inductor-inductor-capacitor) circuit 204_5. Load power converting unit 206, for example, includes a V2L (Vehicle to Load) filter 206_1, a single phase inverter 206_2, and a secondary LLC circuit 206_3. The first HV power converting unit 208, for example, includes a secondary LLC circuit 208_1 and a HV filter 208_2. The second HV power converting unit 210, for example, includes a secondary LLC circuit 210_1 and a HV filter 210_2. The first LV power converting unit 212, for example, includes a secondary LLC circuit 212_1 and a LV filter 212_2. The second LV power converting unit 214, for example, includes a secondary LLC circuit 214_1 and a LV filter 214_2.

A first MCU 228 controls the PFC converter 204_3 and the single phase inverter 206_2. A second MCU 230 controls the secondary LLC circuit 208_1 and the secondary LLC circuit 212_1. A third MCU 232 controls the secondary LLC circuit 210_1 and the secondary LLC circuit 214_1.

AC voltage 234 is inputted to the input power converting unit 204 through an AC terminal 236. The load power converting unit 206 outputs power to a V2L terminal 238. The first HV power converting unit 208 outputs a voltage to a HV terminal 240. The second HV power converting unit 210 outputs a voltage to a HV terminal 242. The first LV power converting unit 212 outputs a voltage to a LV terminal 244. The second LV power converting unit 214 outputs a voltage to a LV terminal 246.

Figure 3:
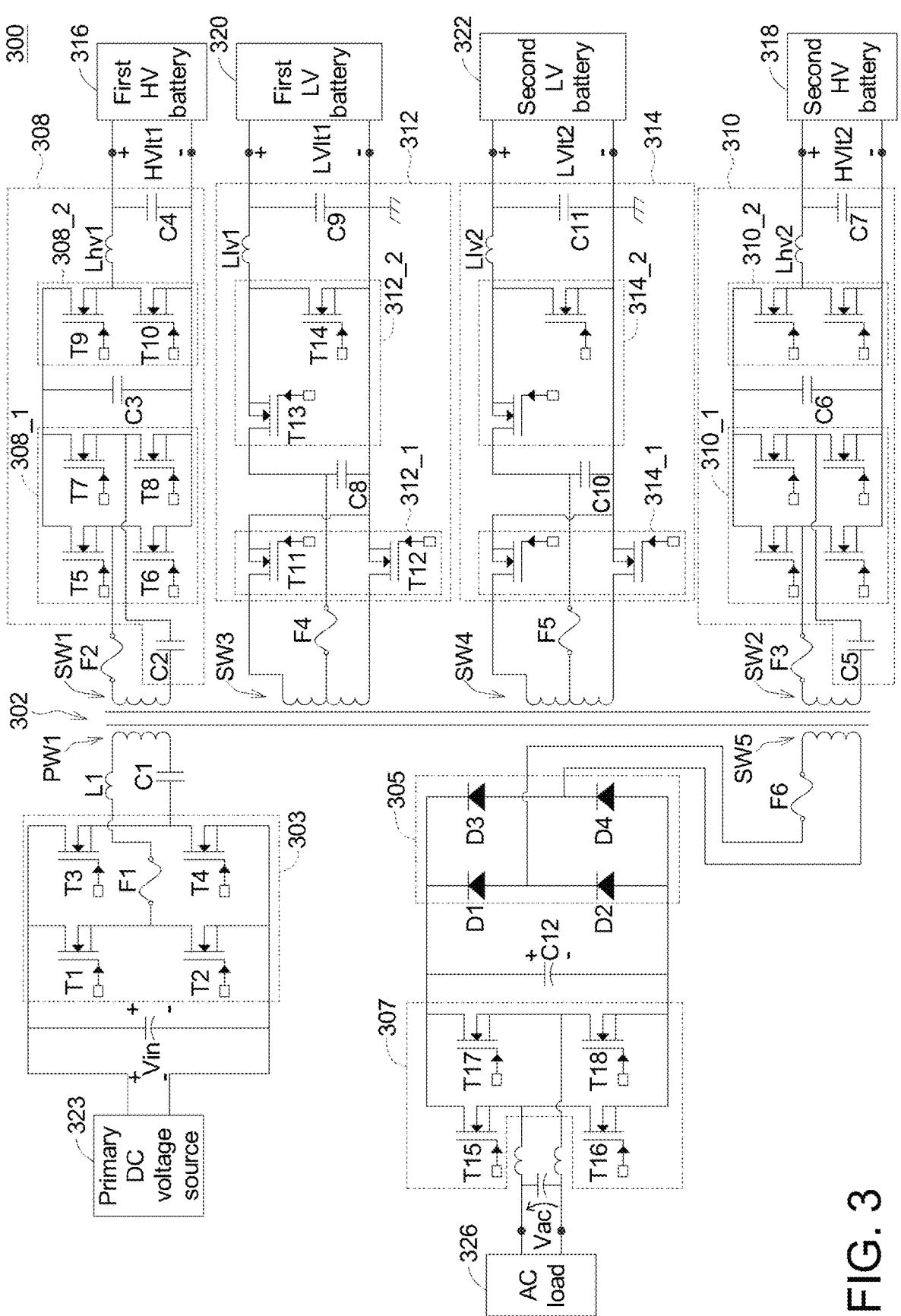
FIG. 3 illustrates a block diagram of a multiple-port bidirectional converter applied in an OPU for an EV according to an embodiment of the disclosure.

Referring to FIG. 3, FIG. 3 illustrates a block diagram of a multiple-port bidirectional converter applied in an OPU for an EV according to an embodiment of the disclosure. The multiple-port bidirectional converter 300 includes a transformer 302, a primary full-bridge converter 303, a first HV power converting unit 308, a second HV power converting unit 310, a first LV power converting unit 312, a second LV power converting unit 314, a full-bridge diode rectifier 305, and a full-bridge inverter 307.

The transformer 302 includes a core (not shown in FIG. 3), a first primary winding PW1, a first secondary winding SW1, a second secondary winding SW2, a third secondary winding SW3, a fourth secondary winding SW4, and a fifth secondary winding SW5. The primary full-bridge converter 303 is coupled to the first primary winding SW1 and receives an input voltage Vin from a primary DC voltage source 323.

The first HV power converting unit 308, coupled to the first secondary winding SW1, outputs a first high DC voltage HVlt1 to a first HV battery 316. The second HV power converting unit 310, coupled to the second secondary winding SW2, outputs a second high DC voltage HVlt2 to a second HV battery 318. The first LV power converting unit 312, coupled to the third secondary winding SW3, outputs a first low DC voltage LVlt1 to a first LV battery 320. The second LV power converting unit 314, coupled to the fourth secondary winding SW4, outputs a second low DC voltage LVlt2 to a second LV battery 322. The full-bridge diode rectifier 305 is coupled to the fifth secondary winding SW5. The full-bridge inverter 307 is coupled to the full-bridge diode rectifier 305 and outputs an AC output voltage Vac to an AC load 326.

The multiple-port bidirectional converter 300 further includes a first fuse F1, a second fuse F2, a third fuse F3, a fourth fuse F4, a fifth fuse F5, and a sixth fuse F6. The first fuse F1 is coupled between the first primary winding PW1 and the primary full-bridge converter 303. The second fuse F2 is coupled between the first secondary winding SW1 and the first HV power converting unit 308. The third fuse F3 is coupled between the second secondary winding SW2 and the second HV power converting unit 310. The fourth fuse F4 is coupled between the third secondary winding SW3 and the first LV power converting unit 312. The fifth fuse F5 is coupled between the fourth secondary winding SW4 and the second LV power converting unit 314. The sixth fuse F6 is coupled between the fifth secondary winding SW5 and the full-bridge diode rectifier 305.

The fuses F1 to F6 are available for isolating faulty power converting unit. For example, when too much current flows through the first HV power converting unit 308, the fuse F2 melts to stop the current, and the fuse F2 isolates the first HV power converting unit 308 from other power converting unit(s) and other components of the multiple-port bidirectional converter 300.

Therefore, other power converting unit(s) and other components of the multiple-port bidirectional converter 300 can be protected.

The multiple-port bidirectional converter 300 further includes a first capacitor C1 and a primary resonant choke L1. One terminal of the first capacitor C1 is coupled to one terminal of the first primary winding PW1. One terminal of the primary resonant choke L1 is coupled to the other terminal of the first primary winding PW1. One terminal of the primary full-bridge converter 303 is coupled to the other terminal of the first capacitor C1. Another terminal of the primary full-bridge converter 303 is coupled to the other terminal of the primary resonant choke L1.

The first HV power converting unit 308 includes a first HV full-bridge converter 308_1, a second capacitor C2 and a third capacitor C3. The second capacitor C2 is coupled between the first HV full-bridge converter 308_1 and the first secondary winding SW1. The third capacitor C3 is coupled between two terminals of the first HV full-bridge converter 308_1.

The first HV power converting unit 308 further includes a first HV bidirectional buck/boost half bridge converter 308_2, coupled to the third capacitor C3. The first HV power converting unit 308 further includes a first HV buck/boost choke Lhv1 and a fourth capacitor C4. The first HV buck/boost choke Lhv1 is coupled to the first HV bidirectional buck/boost half bridge converter 308_2, and the fourth capacitor C4 is coupled to the first HV buck/boost choke Lhv1. A voltage of the fourth capacitor C4 is the first high DC voltage HVlt1.

The second HV power converting unit 310 includes a second HV full-bridge converter 310_1, a fifth capacitor C5 and a sixth capacitor C6. The fifth capacitor C5 is coupled between the second HV full-bridge converter 310_1 and the second secondary winding SW2. The sixth capacitor C6 is coupled between two terminals of the second HV full-bridge converter 310_1. The second HV power converting unit 310 further includes a second HV bidirectional buck/boost half bridge converter 310_2, coupled to the sixth capacitor C6.

The second HV power converting unit 310 further includes a second HV buck/boost choke Lhv2 and a seventh capacitor C7. The second HV buck/boost choke Lhv2 is coupled to the second HV bidirectional buck/boost half bridge converter 310_2, and the seventh capacitor C7 is coupled to the second HV buck/boost choke Lhv2. A voltage of the seventh capacitor C7 is the second high DC voltage HVlt2.

The first LV power converting unit 312 includes a first synchronous rectifier (SR) 312_1 and an eighth capacitor C8. The eighth capacitor C8 is coupled to the first SR 312_1. The first LV power converting unit 312 further includes a first bidirectional LV buck/boost half bridge converter 312_2, a first LV buck/boost choke Llv1, and a ninth capacitor C9. The first LV buck/boost choke Llv1 is coupled between the first bidirectional LV buck/boost half bridge converter 312_2 and the ninth capacitor C9. A voltage of the ninth capacitor C9 is the first low DC voltage LVlt1.

The second LV power converting unit 314 includes a second SR 314_1 and a tenth capacitor C10. The tenth capacitor C10 is coupled to the second SR 314_1. The second LV power converting unit 314 further includes a second bidirectional LV buck/boost half bridge converter 314_2, a second LV buck/boost choke Llv2, and an eleventh capacitor C11. The second LV buck/boost choke Llv2 is coupled between the second bidirectional LV buck/boost half bridge converter 314_2 and the eleventh capacitor C11. A voltage of the eleventh capacitor C11 is the second low DC voltage LVlt2.

The multiple-port bidirectional converter 300 further includes a twelfth capacitor C12. One terminal of the full-bridge diode rectifier 305 is coupled to one terminal of the fifth secondary winding SW5. One terminal of the full-bridge diode rectifier 305 is coupled to the other terminal of the fifth secondary winding SW5. The twelfth capacitor C12 is coupled between two terminals of the full-bridge diode rectifier 305, and the full-bridge inverter 307 is coupled to the twelfth capacitor C12.

A number of turns of the first secondary winding SW1 is greater than a number of turns of the third secondary winding SW3. Therefore, the voltage value of the first high DC voltage HVlt1 is larger than the first low DC voltage LVlt1. Similarly, a number of turns of the second secondary winding SW2 is greater than a number of turns of the fourth secondary winding SW4. Therefore, the voltage value of the second high DC voltage HVlt2 is larger than the second low DC voltage LVlt2. For example, the number of turns of the first secondary winding SW1 may be 14, the number of turns of the second secondary winding SW2 may be 14, the number of turns of the third secondary winding SW3 may be 2, and the number of turns of the fourth secondary winding SW4 may be 2.

When the multiple-port bidirectional converter 300 operates in a first operation mode, for example, AC charging mode, the primary full-bridge converter 303 transfers power to the first HV battery 316, the second HV battery 318, the first LV battery 320, the second LV battery 322, and the AC load 326. That is, the power inputted from AC grid is converted to input voltage Vin, which is a DC voltage, by an AC to DC converter, a PFC converter or a T-type converter, for example. Then, the input voltage Vin is inputted to the primary full-bridge converter 303. By turning on and off the switches T1 to T4 in a particular sequence, an AC voltage is generated by the primary full-bridge converter 303 and inputted to the first primary winding PW1 through the first capacitor C1 and the primary resonant choke L1. Then, the power is transferred from the first primary winding PW1 to the first secondary winding SW1, the second secondary winding SW2, the third secondary winding SW3, the fourth secondary winding SW4 and the fifth secondary winding SW5 through magnetic coupling in the transformer 302. After that, the power is delivered to the first HV battery 316, the second HV battery 318, the first LV battery 320, the second LV battery 322, and the AC load 326 through the first HV power converting unit 308, the second HV power converting unit 310, the first LV power converting unit 312, the second LV power converting unit 314, and the full-bridge diode rectifier 305 and the full-bridge inverter 307, which are coupled to the first secondary windings SW1 to fifth secondary windings SW5, respectively.

In order to convert the input voltage Vin to an AC voltage in the primary full-bridge converter 303, for example, the switches T1 and T4 are turned on and the switches T2 and T3 are turned off in a first time period. For example, a first time period may be a half cycle of a switching period of the switches T1~T4. After that, the switches T1 and T4 are turned off and the switches T2 and T3 are turned on in a second time period. The first time period and the second time period are repeated and alternated. The frequency of turning on/off the switches T1 to T4 can be adjusted or the first time period and the second time period can be adjusted to generate an AC voltage with different frequency or amplitude. For example, a first time period may be a first half cycle of a switching period of the switches T1~T4, and a second time period may be a second half cycle of the switching period of the switches T1~T4.

The operation of the first HV power converting unit 308 is described as follows. By turning on and off the switches T5 to T8 in a particular sequence, the AC voltage generated by the first secondary winding SW1 is converted to a DC voltage across the third capacitor C3. For example, the switches T5 and T8 are turned on and the switches T6 and T7 are turned off in a positive voltage period of the AC voltage generated by the first secondary winding SW1 to charge the third capacitor C3 and the voltage of the third capacitor C3 is increased. Then, the switches T6 and T7 are turned on and the switches T5 and T8 are turned off in a negative voltage period of the AC voltage generated by the first secondary winding SW1 to charge the third capacitor C3 and the voltage of the third capacitor C3 is continuously increased.

After that, by turning on the switch T9, the electricity in the third capacitor C3 is transferred to the fourth capacitor C4. When the switch T10 is turned on, the fourth capacitor C4 is discharged and the voltage of the fourth capacitor C4 is reduced. The time period of turning on the switch T9 and the time period of turning on the switch T10 determine the voltage of the fourth capacitor C4. By controlling the time periods of turning on the switches T9 and T10 or controlling the ratio of the time periods of turning on the switches T9 and T10, the voltage of the fourth capacitor C4 is determined. By controlling different time periods of turning on the switches T9 and T10 or controlling different ratios of the time periods of turning on the switches T9 and T10, different voltages of the fourth capacitor C4 can be achieved and wide voltage range of the fourth capacitor C4 is provided. In some embodiment, the first HV bidirectional buck/boost half bridge converter 308_2 can be omitted when the wide voltage range of the fourth capacitor C4 is not necessary.

The power stored in the fourth capacitor C4 is utilized for charging the first HV battery 316. Above procedures are repeated during charging of the first HV battery 316. The operation of the second HV power converting unit 310 is similar to the operation of the first HV power converting unit 308, and will not be repeated here.

The operation of the first LV power converting unit 312 is described as follows. By turning on and off the switches T11 and T12 in a particular sequence, the AC voltage generated by the third secondary winding SW3 is converted to a DC voltage across the eighth capacitor C8. For example, one of the switches T11 and T12 is turned on during a positive voltage period of the AC voltage generated by the third secondary winding SW3 to charge the eighth capacitor C8. Then, another of the switches T11 and T12 is turned on during a negative voltage period of the AC voltage generated by the third secondary winding SW3 to charge the eighth capacitor C8. After that, by turning on the switch T13, the electricity in the eighth capacitor C8 is transferred to the ninth capacitor C9 and the energy is stored into the first LV buck/boost choke Llv1. When the switch T13 is turned off and the switch T14 is turned on, the ninth capacitor C9 is discharged, the energy in the first LV buck/boost choke Llv1 is released, and the voltage of the ninth capacitor C9 is reduced. The time period of turning on the switch T13 and the time period of turning on the switch T14 determines the voltage of the ninth capacitor C9. By controlling the time periods of turning on the switches T13 and T14 or controlling the ratio of the time periods of turning on the switches T13 and T14, the voltage of the ninth capacitor C9 is determined. By providing different time periods of turning on the switches T13 and T14 or different ratios of the time periods of turning on the switches T13 and T14, different voltages of the ninth capacitor C9 can be achieved and wide voltage range of the ninth capacitor C9 is provided. The power stored in the ninth capacitor C9 is utilized for charging the first LV battery 320. In some embodiment, the first bidirectional LV buck/boost half bridge converter 312_2 can be omitted when the wide voltage range of the ninth capacitor C9 is not necessary.

Above procedures are repeated during charging of the first LV battery 320. The operation of the second LV power converting unit 314 is similar to the operation of the first LV power converting unit 312, and will not be repeated here.

The operation of the full-bridge diode rectifier 305 and the full-bridge inverter 307 is described as follows. When the AC voltage outputted by the fifth secondary winding SW5 is positive, diode D1 and diode D4 are turned on and current flows through the diode D1 and the diode D4 to charge the twelfth capacitor C12. When the AC voltage outputted by the fifth secondary winding SW5 is negative, diode D2 and diode D3 are turned on and current flows through the diode D2 and the diode D3 to charge the twelfth capacitor C12.

After that, the switches T15 and T18 are turned on and the switches T16 and T17 are turned off in a first time period, and the switches T15 and T18 are turned off and the switches T16 and T17 are turned on in a second time period. By this way, the DC voltage across the twelfth capacitor C12 is converted to the AC output voltage Vac.

Additionally, the switches T1~T18 may be transistors. Other switches in the Figures of this disclosure may be transistors.

When the multiple-port bidirectional converter 300 operates in a second operation mode, for example, reverse operation mode, at least one of the first HV power converting unit 308 and the second HV power converting unit 310 transfers power to at least one of the first LV battery 320, the second LV battery 322, the primary DC voltage source 323 and the AC load 326.

Take the first HV power converting unit 308 for example. The power stored in the first HV battery 316 is transferred to the fourth capacitor C4. Then, the power in the fourth capacitor C4 is transferred to the third capacitor C3 by turning on the switch T9. The time period of turning on the switch T9 determines the voltage of the third capacitor C3. When the switch T10 is turned on, the energy is stored into the first HV buck/boost choke Lhv1. When switch T10 is turned off and switch T9 is turned on, the energy in the first HV buck/boost choke Lhv1 is released and charged to the third capacitor C3. By controlling the time periods of turning on or off the switches T9 and T10, the voltage of the third capacitor C3 is determined.

By turning on and off the switches T5 to T8 in a particular sequence, the AC voltage outputted to the first secondary winding SW1 is generated. For example, the switches T5 and T8 are turned on and the switches T6 and T7 are turned off to generate a positive voltage of the AC voltage for the first secondary winding SW1. Then, the switches T6 and T7 are turned on and the switches T5 and T8 are turned off to generate a negative voltage of the AC voltage generated for the first secondary winding SW1. The power in the first secondary winding SW1 is transferred to at least one of the second secondary winding SW2, the third secondary winding SW3, the fourth secondary winding SW4, the fifth secondary winding SW5 and the first primary winding PW1 by magnetic coupling. Then, the power in the at least one of the second secondary winding SW2, the third secondary winding SW3, the fourth secondary winding SW4, the fifth secondary winding SW5 and the first primary winding PW1 is transferred to at least one of the second HV battery 318, the first LV battery 320, the second LV battery 322, the primary DC voltage source 323 and the AC load 326.

Furthermore, the multiple-port bidirectional converter 300 can operate in a third operation mode, for example, a redundant mode, when one of the first HV power converting unit 308, the second HV power converting unit 310, the first LV power converting unit 312, and the second LV power converting unit 314 fails. When one of the first HV power converting unit 308 and the second HV power converting unit 310 fails, the other of the first HV power converting unit 308 and the second HV power converting unit 310 transfers power to at least one of the first LV battery 320 and the second LV battery 322. Besides, when one of the first LV power converting unit 312 and the second LV power converting unit 314 fails, at least one of the first HV power converting unit 308 and the second HV power converting unit 310 transfers power to the first LV battery 320 or the second LV battery 322 corresponding to the other of the first LV power converting unit 312 and the second LV power converting unit 314. The redundant mode of the multiple-port bidirectional converter 300 will be explained more with FIG. 4.

Referring to FIG. 4, FIG. 4 shows an example of the redundant mode operated by the multiple-port bidirectional converter 300 applied in an OPU for an EV according to an embodiment of the disclosure. In the table shown in FIG. 4, the mark "IN" representing that the corresponding unit acts as an input unit to provide power to other unit(s). The mark "OUT" representing that the corresponding unit acts as an output unit to receive power from other unit(s). The mark "X" representing that the corresponding unit does not work.

In situation 1, the first HV battery 316 fails, and the first HV power converting unit 308 does not work. The second HV power converting unit 310 supplies power to both of the first LV power converting unit 312 and the second LV power converting unit 314. Then, the first LV power converting unit 312 and the second LV power converting unit 314 supply power to the first LV battery 320 and the second LV battery 322, respectively.

In situation 2, the second HV battery 318 fails and the second HV power converting unit 310 does not work. The first HV power converting unit 308 supplies power to both of the first LV power converting unit 312 and the second LV power converting unit 314. Then, the first LV power converting unit 312 and the second LV power converting unit 314 supply power to the first LV battery 320 and the second LV battery 322, respectively.

In situation 3, the first LV power converting unit 312 fails and the first LV power converting unit 312 does not work. Both of the first HV power converting unit 308 and the second HV power converting unit 310 supply power to the second LV power converting unit 314. Then, the second LV power converting unit 314 supplies power to the second LV battery 322.

In situation 4, the second LV battery 322 fails and the second LV power converting unit 314 does not work. Both of the first HV power converting unit 308 and the second HV power converting unit 310 supply power to the first LV power converting unit 312. Then, the first LV power converting unit 312 supplies power to the first LV battery 320.

In situation 5, both of the first HV battery 316 and the first LV battery 320 fail, and both of the first HV power converting unit 308 and the first LV power converting unit 312 do not work. The second HV power converting unit 310 and the second LV power converting unit 314 operate normally. The second HV power converting unit 310 supplies power to the second LV power converting unit 314, and the second LV power converting unit 314 supplies power to the second LV battery 322.

In situation 6, both of the second HV battery 318 and the second LV battery 322 fail, and both of the second HV power converting unit 310 and the second LV converting unit 314 do not work. The first HV power converting unit 308 and the first LV power converting unit 312 operate normally. The first HV power converting unit 308 supplies power to the first LV power converting unit 312, and the first LV power converting unit 312 supplies power to the first LV battery 320.

In summary, when the multiple-port bidirectional converter 300 operates in the first operation mode (or the AC charging mode), the primary full-bridge converter 303 transfers power received from the AC grid to the first HV battery 316, the second HV battery 318, the first LV battery 320, the second LV battery 322, and the AC load 326. When the multiple-port bidirectional converter 300 operates in a second operation mode (or the reverse operation mode), at least one of the first HV power converting unit 308 and the second HV power converting unit 310 transfers power to at least one of the first LV battery 320, the second LV battery 322, the primary DC voltage source 323, and the AC load 326. The reverse operation mode provides a flexible power sharing among the first HV battery 316, the second HV battery 318, the first LV battery 320, and the second LV battery 322. The reverse operation mode allows battery auto balancing. In case of any failure happening in the power converting unit(s) or the battery, the multiple-port bidirectional converter 300 will operate in the third operation mode (or the redundant mode). With the redundant mode, when any power converting unit or battery fails, other power converting unit(s) can be used to charge other battery/batteries. Even if the EV has been driven for a long time and no EV charging station can be found, the battery/batteries can still be charged by using other power converting unit(s) that can operate normally by operating the multiple-port bidirectional converter 300 in the redundant mode. Therefore, the convenience of use can be improved.

Figure 5:
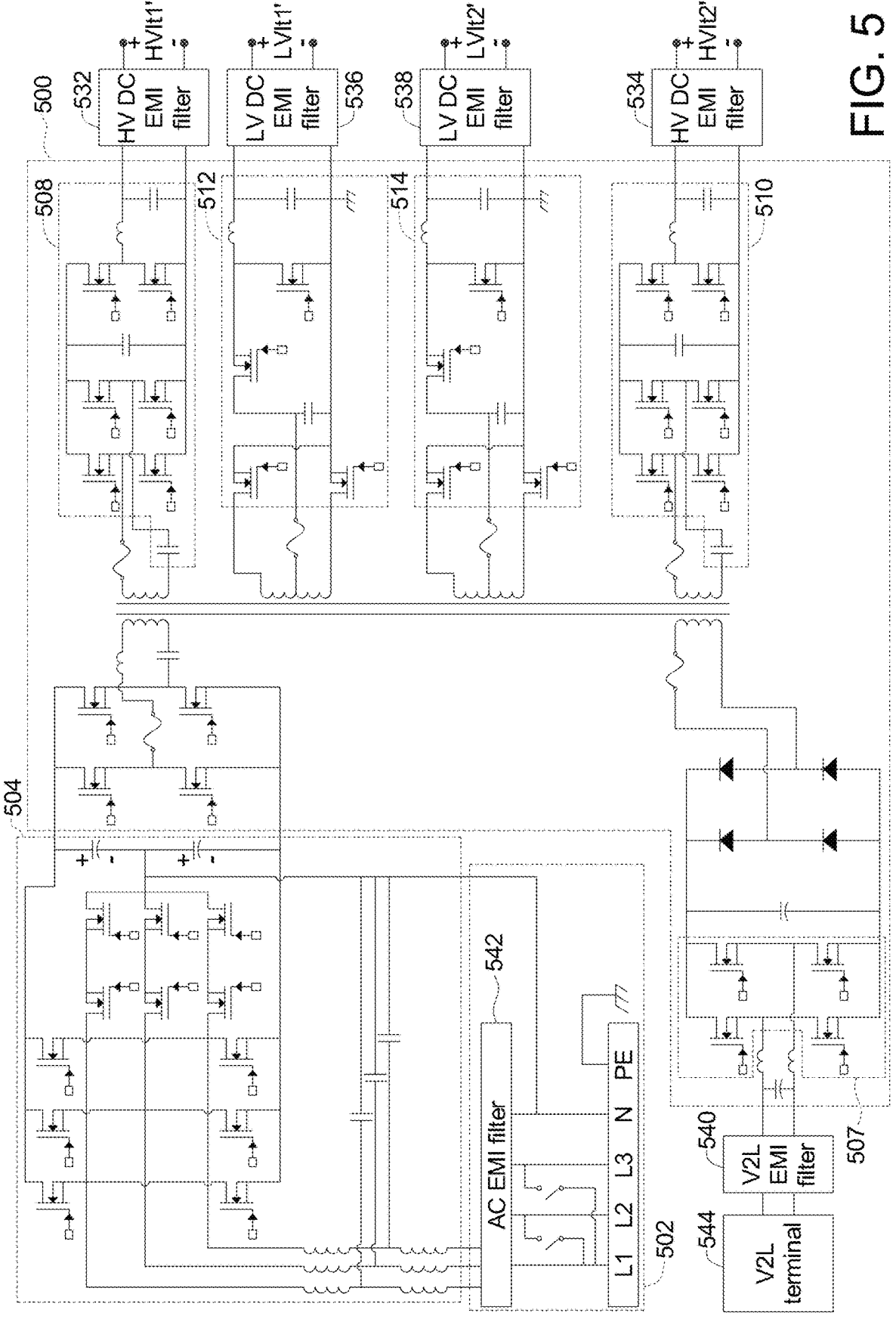
FIG. 5 illustrates a block diagram of a multiple-port bidirectional converter applied in an OPU for an EV according to another embodiment of the disclosure.

Referring to FIG. 5, FIG. 5 illustrates a block diagram of a multiple-port bidirectional converter applied in an OPU for an EV according to another embodiment of the disclosure. The multiple-port bidirectional converter 500 differs from the multiple-port bidirectional converter 300 of FIG. 3 in that the multiple-port bidirectional converter 500 further includes an AC input circuit 502, a T-type converter 504, a HV DC EMI filter 532, a HV DC EMI filter 534, a LV DC EMI filter 536, a LV DC EMI filter 538, and a V2L EMI filter 540. In the AC input circuit 502, three phase signals L1, L2, and L3 and neutral N of the AC input or grid is sent to the AC EMI filter 542. Mark "PE" of FIG. 5 represents ground. Then, the phase signals are sent to the T-type converter 504 to be converted to a DC voltage.

Besides, the DC voltage outputted from the first HV power converting unit 508 is sent to the HV DC EMI filter 532 to generate a first high DC voltage HVlt1'. The DC voltage outputted from the second HV power converting unit 510 is sent to the HV DC EMI filter 534 to generate a second high DC voltage HVlt2'. The DC voltage outputted from the first LV power converting unit 512 is sent to the LV DC EMI filter 536 to generate a first low DC voltage LVlt1'. The DC voltage outputted from the second LV power converting unit 514 is sent to the LV DC EMI filter 538 to generate a second low DC voltage LVlt2'. The AC voltage outputted from the full-bridge inverter 507 is sent to the V2L EMI filter 540 and then sent to the V2L terminal 544.

Figure 6A:
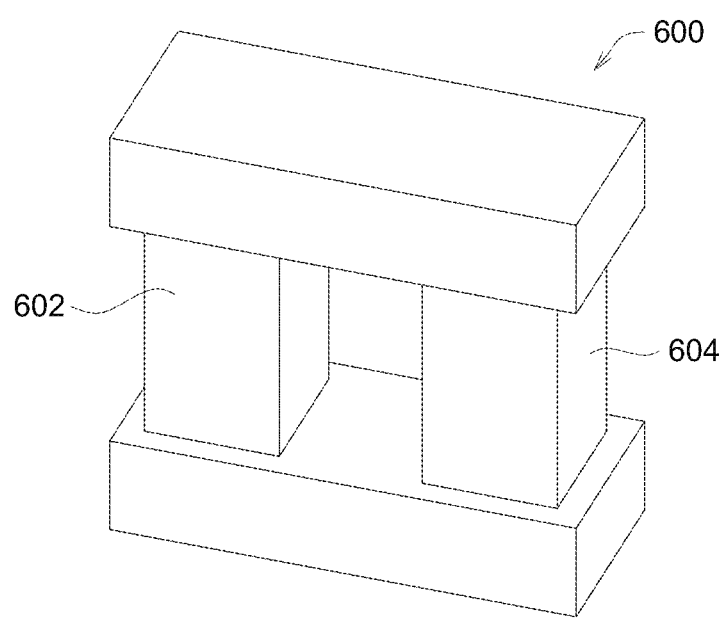
FIG. 6A illustrates a core structure of the transformer in the multiple-port bidirectional converter applied in an OPU for an EV according to another embodiment of the disclosure.
Figure 6B:
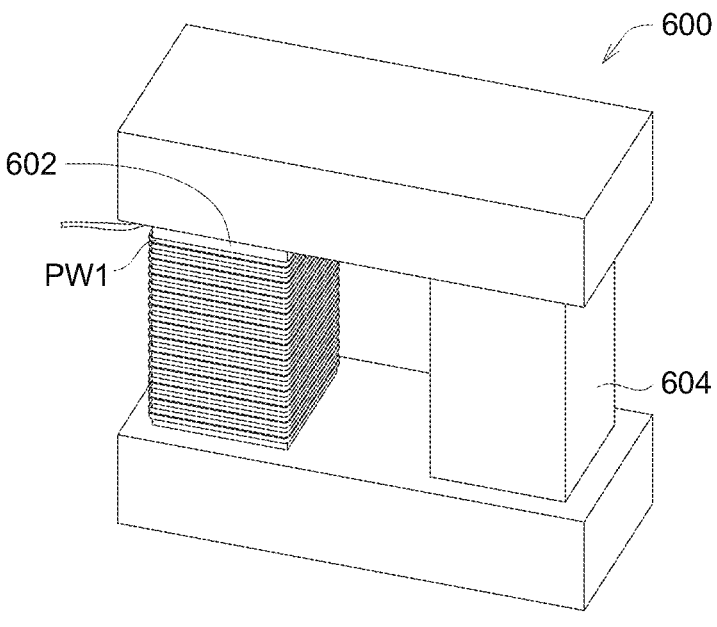
FIG. 6B shows an example of the first primary winding in the multiple-port bidirectional converter.
Figure 6C:
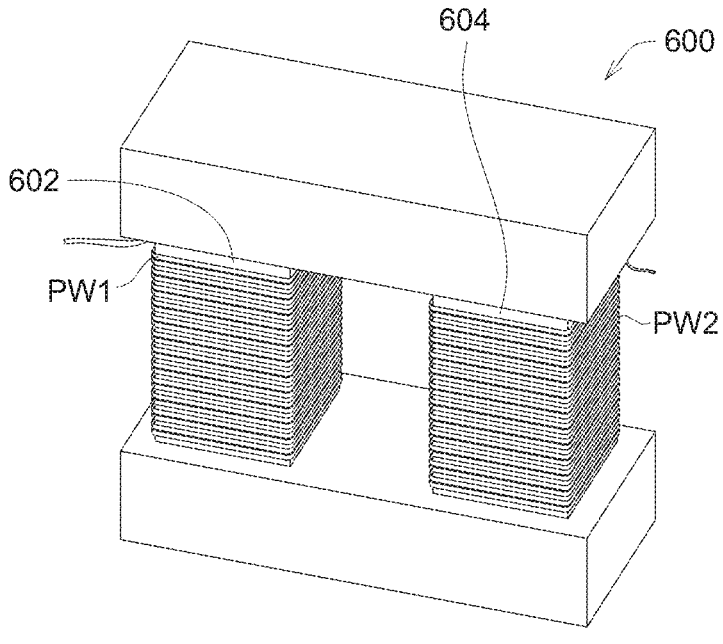
FIG. 6C shows an example of the first primary winding and a second primary winding in the multiple-port bidirectional converter.

Referring to FIG. 6A to FIG. 6C, FIG. 6A illustrates a core structure of the transformer in the multiple-port bidirectional converter applied in an OPU for an EV according to another embodiment of the disclosure, FIG. 6B shows an example of the first primary winding in the multiple-port bidirectional converter, and FIG. 6C shows an example of the first primary winding and a second primary winding in the multiple-port bidirectional converter.

As shown in FIG. 6A, the core 600 of the transformer 102 or 302 includes a first core column 602 and a second core column 604. As shown in FIG. 6B, the first primary winding PW1 is wound around the first core column 602. In one embodiment, as shown in FIG. 6C, the transformer 102 or 302 further includes a second primary winding PW2, the first primary winding PW1 is wound around the first core column 602, and the second primary winding PW2 is wound around the second core column 604. The first primary winding PW1 and the second primary winding PW2 are connected in parallel. The first primary winding PW1 and the second primary winding PW2 which are connected in parallel can receive an input voltage Vin from a primary DC voltage source or a power supply.

The multiple-port bidirectional converter according to an embodiment of the disclosure proposes an integrated power supply with multiple ports to provide redundant operation for combo onboard charger with 1 primary AC input port, 2 HV DC output ports, 2 LV DC output ports, and 1 V2L output port. The power is flexibly shared among these multiple ports through magnetic coupling with a multiple-winding common transformer. According to an embodiment of the disclosure, the multiple-port bidirectional converter will save 5 transformers and 5 corresponding sets of full-bridge converters compared to another converter with 6 transformers for 6 ports. Therefore, the cost and size of the multiple-port bidirectional converter according to an embodiment of the disclosure is reduced with less key component count.

The multiple-port bidirectional converter according to an embodiment of the disclosure also provides bidirectional power flow among these multiple ports, provides wide output voltage range on HV DC battery and LV DC battery or HV DC battery bank and LV DC battery bank for wide voltage range regulation. Besides, the redundant operation can be achieved in the multiple-port bidirectional converter according to an embodiment of the disclosure when some battery fails or some power converting unit fails.

Furthermore, the multiple-port bidirectional converter according to an embodiment of the disclosure has the advantages of high power efficiency, power flow control flexibility, and wide voltage range operation. The multiple-port bidirectional converter according to an embodiment of the disclosure can operate at fixed switching frequency to provide constant output voltage at each port. The multiple-port bidirectional converter according to an embodiment of the disclosure can be designed to operate at slightly higher frequency than a resonant frequency (corresponding to the capacitors and chokes in the multiple-port bidirectional converter) in order to achieve zero voltage switching (ZVS) for power converting units, and to minimize the magnetizing loss in the transformer. Therefore, the efficiency of the multiple-port bidirectional converter is optimized.

Besides, the multiple-port bidirectional converter according to an embodiment of the disclosure is capable of implementing droop control through flexible power sharing. Droop control can be executed through controlling over the power converting units by MCU. Droop control involves reducing voltage or frequency as the grid load increases. To ensure grid stability, the multiple-port bidirectional converter can adopt flexible power sharing among the power supply, HV batteries, LV batteries, and AC load as necessary to mitigate grid impact. By dynamically adjusting the power output of the power converting units to enable shared power usage, grid load can be reduced, and grid load balancing and stability can be effectively managed.

Moreover, bidirectional buck/boost half bridge converters in the multiple-port bidirectional converter according to an embodiment of the disclosure are employed to provide wide voltage range at HV ports and LV ports. Therefore, HV batteries and LV batteries or the HV battery bank and LV battery bank can have a wide voltage range, and are able to adapt with a variety of battery voltage range from different car makers.

Additionally, the multiple-port bidirectional converter according to an embodiment of the disclosure may include a transformer with additional secondary windings, and may include additional power converting units to connect to energy sources such as a solar photovoltaic module or a wind power generator.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A multiple-port bidirectional converter, comprising:
a transformer, a primary full-bridge converter, a first high voltage (HV) power converting unit, a second HV power converting unit, a first low voltage (LV) power converting unit, a second LV power converting unit, a full-bridge diode rectifier, and a full-bridge inverter;
wherein the transformer comprises a core, a first primary winding, a first secondary winding, a second secondary winding, a third secondary winding, a fourth secondary winding, and a fifth secondary winding;
wherein the primary full-bridge converter is coupled to the first primary winding and receives an input voltage from a primary direct current (DC) voltage source;
wherein the first HV power converting unit, coupled to the first secondary winding, outputs a first high DC voltage to a first HV battery;
wherein the second HV power converting unit, coupled to the second secondary winding, outputs a second high DC voltage to a second HV battery;
wherein the first LV power converting unit, coupled to the third secondary winding, outputs a first low DC voltage to a first LV battery;
wherein the second LV power converting unit, coupled to the fourth secondary winding, outputs a second low DC voltage to a second LV battery;
wherein the full-bridge diode rectifier is coupled to the fifth secondary winding;
wherein the full-bridge inverter is coupled to the full-bridge diode rectifier and outputs an alternating current (AC) output voltage to an AC load.

2. The multiple-port bidirectional converter according to claim 1, wherein in a first operation mode, the primary full-bridge converter transfers power to the first HV battery, the second HV battery, the first LV battery, the second LV battery, and the AC load;
wherein in a second operation mode, at least one of the first HV power converting unit and the second HV power converting unit transfers power to at least one of the first LV battery, the second LV battery, the primary DC voltage source and the AC load.

3. The multiple-port bidirectional converter according to claim 1, wherein the core comprises a first core column and a second core column;
wherein the transformer further comprises a second primary winding, the first primary winding is wound around the first core column, and the second primary winding is wound around the second core column.

4. The multiple-port bidirectional converter according to claim 3, wherein the first primary winding and the second primary winding are connected in parallel.

5. The multiple-port bidirectional converter according to claim 1, wherein a number of turns of the first secondary winding is greater than a number of turns of the third secondary winding.

6. The multiple-port bidirectional converter according to claim 2, wherein when one of the first HV power converting unit and the second HV power converting unit fails, the other of the first HV power converting unit and the second HV power converting unit transfers power to at least one of the first LV battery and the second LV battery.

7. The multiple-port bidirectional converter according to claim 2, wherein when one of the first LV power converting unit and the second LV power converting unit fails, at least one of the first HV power converting unit and the second HV power converting unit transfers power to the first LV battery or the second LV battery corresponding to the other of the first LV power converting unit and the second LV power converting unit.

8. The multiple-port bidirectional converter according to claim 1, further comprising:

a first fuse, coupled between the first primary winding and the primary full-bridge converter;

a second fuse, coupled between the first secondary winding and the first HV power converting unit;

a third fuse, coupled between the second secondary winding and the second HV power converting unit; and a fourth fuse, coupled between the third secondary winding and the first LV power converting unit;

a fifth fuse, coupled between the fourth secondary winding and the second LV power converting unit; and a sixth fuse, coupled between the fifth secondary winding and the full-bridge diode rectifier.

9. The multiple-port bidirectional converter according to claim 1, further comprising a first capacitor and a primary resonant choke;

wherein one terminal of the first capacitor is coupled to one terminal of the first primary winding, one terminal of the primary resonant choke is coupled to the other terminal of the first primary winding;

wherein one terminal of the primary full-bridge converter is coupled to the other terminal of the first capacitor, another terminal of the primary full-bridge converter is coupled to the other terminal of the primary resonant choke.

10. The multiple-port bidirectional converter according to claim 9, wherein the first HV power converting unit comprises a first HV full-bridge converter, a second capacitor and a third capacitor, the second capacitor is coupled between the first HV full-bridge converter and the first secondary winding, the third capacitor is coupled between two terminals of the first HV full-bridge converter.

11. The multiple-port bidirectional converter according to claim 10, wherein the first HV power converting unit further comprises a first HV bidirectional buck/boost half bridge converter, coupled to the third capacitor.

12. The multiple-port bidirectional converter according to claim 11, wherein the first HV power converting unit further comprises a first HV buck/boost choke and a fourth capacitor, the first HV buck/boost choke is coupled to the first HV bidirectional buck/boost half bridge converter, and the fourth capacitor is coupled to the first HV buck/boost choke, a voltage of the fourth capacitor is the first high DC voltage.

13. The multiple-port bidirectional converter according to claim 12, wherein the second HV power converting unit comprises a second HV full-bridge converter, a fifth capacitor and a sixth capacitor, the fifth capacitor is coupled between the second HV full-bridge converter and the second secondary winding, the sixth capacitor is coupled between two terminals of the second HV full-bridge converter.

14. The multiple-port bidirectional converter according to claim 13, wherein the second HV power converting unit further comprises a second HV bidirectional buck/boost half bridge converter, coupled to the sixth capacitor.

15. The multiple-port bidirectional converter according to claim 14, wherein the second HV power converting unit further comprises a second HV buck/boost choke and a seventh capacitor, the second HV buck/boost choke is coupled to the second HV bidirectional buck/boost half bridge converter, and the seventh capacitor is coupled to the second HV buck/boost choke, a voltage of the seventh capacitor is the second high DC voltage.

16. The multiple-port bidirectional converter according to claim 15, wherein the first LV power converting unit comprises a first synchronous rectifier (SR) and an eighth capacitor, the eighth capacitor is coupled to the first SR.

17. The multiple-port bidirectional converter according to claim 16, wherein the first LV power converting unit further comprises a first bidirectional LV buck/boost half bridge converter, a first LV buck/boost choke, and a ninth capacitor, the first LV buck/boost choke is coupled between the first bidirectional LV buck/boost half bridge converter and the ninth capacitor, a voltage of the ninth capacitor is the first low DC voltage.

18. The multiple-port bidirectional converter according to claim 17, wherein the second LV power converting unit comprises a second SR and a tenth capacitor, the tenth capacitor is coupled to the second SR.

19. The multiple-port bidirectional converter according to claim 18, wherein the second LV power converting unit further comprises a second bidirectional LV buck/boost half bridge converter, a second LV buck/boost choke, and an eleventh capacitor, the second LV buck/boost choke is coupled between the second bidirectional LV buck/boost half bridge converter and the eleventh capacitor, a voltage of the eleventh capacitor is the second low DC voltage.

20. The multiple-port bidirectional converter according to claim 19, further comprising a twelfth capacitor;

wherein one terminal of the full-bridge diode rectifier is coupled to one terminal of the fifth secondary winding, one terminal of the full-bridge diode rectifier is coupled to the other terminal of the fifth secondary winding, the twelfth capacitor is coupled between two terminals of the full-bridge diode rectifier, and the full-bridge inverter is coupled to the twelfth capacitor.

* * * * *